(12) United States Patent
Marini

(10) Patent No.: US 9,573,326 B2
(45) Date of Patent: *Feb. 21, 2017

(54) KIT FOR INFLATING AND REPAIRING INFLATABLE ARTICLES, IN PARTICULAR TYRES

(71) Applicant: TEK GLOBAL S.R.L., Pesaro (IT)

(72) Inventor: Maurizio Marini, Pesaro (IT)

(73) Assignee: TEK GLOBAL S.R.L., Pesaro (PU) (IT)

( * ) Notice: Subject to any disclaimer, the term of this patent is extended or adjusted under 35 U.S.C. 154(b) by 45 days.

This patent is subject to a terminal disclaimer.

(21) Appl. No.: 14/133,984

(22) Filed: Dec. 19, 2013

(65) Prior Publication Data

US 2014/0373971 A1 Dec. 25, 2014

Related U.S. Application Data

(63) Continuation of application No. 12/845,897, filed on Jul. 29, 2010, now Pat. No. 8,752,595, which is a (Continued)

(30) Foreign Application Priority Data

Feb. 27, 2004 (IT) .............................. TO2004A0117

(51) Int. Cl.
  *B60S 5/04* (2006.01)
  *B29C 73/16* (2006.01)
  (Continued)

(52) U.S. Cl.
  CPC ........... *B29C 73/166* (2013.01); *B29C 73/025* (2013.01); *B60S 5/046* (2013.01); *B29L 2030/00* (2013.01)

(58) Field of Classification Search
  CPC ...... B29C 73/025; B29C 73/16; B29C 73/163; B29C 73/166
  (Continued)

(56) References Cited

U.S. PATENT DOCUMENTS

| 2,812,783 | A | 11/1957 | Bufogle |
| 3,729,033 | A | 4/1973 | Bayerkohler |

(Continued)

FOREIGN PATENT DOCUMENTS

| DE | 198 46 451 A1 | 4/2000 |
| DE | 201 13 129 | 12/2001 |

(Continued)

OTHER PUBLICATIONS

Orders regarding Summary Judgments in *SSI Systems International Inc. and Accessories Marketing, Inc.*, v. *Tek Global S.R.L. and Tek Corporation* (Case No. 11-CV-00774 PSG: Docket 99, 100) and *Tek Global S.R.L. and Tek Corporation* v. *SSI Systems International Inc., and Accessories Marketing, Inc.* (Case No. 11-CV-01649 PSG: Docket 98, 101, 103) of the United States District Court, Northern District of California, San Jose Division, by United States Magistrate Judge Paul A. Grewel, dated Mar. 7, 2013.

*Primary Examiner* — Nicolas A Arnett
(74) *Attorney, Agent, or Firm* — Ladas & Parry LLP

(57) ABSTRACT

A kit for inflating and repairing inflatable articles, in particular tires, the kit having a compressor assembly, a container of sealing liquid and connectors for connecting the container to the compressor assembly and to an inflatable article for repair or inflation; the compressor assembly being housed in an outer casing defining a seat for the container of sealing liquid. The container is housed removably in the seat and functionally connected to the compressor assembly so as to form a compact unit ready for use.

13 Claims, 4 Drawing Sheets

Related U.S. Application Data continuation of application No. 10/591,033, filed as application No. PCT/IB2005/000309 on Feb. 8, 2005, now Pat. No. 7,789,110.

(51) Int. Cl.
  *B29C 73/02* (2006.01)
  *B29L 30/00* (2006.01)

(58) Field of Classification Search
  USPC .......................................... 141/38; 152/415
  See application file for complete search history.

(56) References Cited

U.S. PATENT DOCUMENTS

| | | |
|---|---|---|
| 4,104,494 A | 8/1978 | Swann |
| 4,137,206 A | 1/1979 | Kent |
| 4,224,208 A | 9/1980 | Kent |
| 4,276,898 A | 7/1981 | Ross |
| 4,308,776 A | 1/1982 | Gillespie et al. |
| 4,317,206 A | 2/1982 | Nossen |
| 4,337,332 A | 6/1982 | Melancon et al. |
| 4,426,468 A | 1/1984 | Ornum et al. |
| D275,291 S | 8/1984 | Dunlap |
| 4,498,515 A | 2/1985 | Holtzhauser et al. |
| 4,501,825 A | 2/1985 | Magyar et al. |
| 4,528,331 A | 7/1985 | Bohm et al. |
| 4,713,114 A | 12/1987 | Smith |
| D295,754 S | 5/1988 | Wang |
| D298,832 S | 12/1988 | Dunlap |
| 4,798,233 A | 1/1989 | Mooney |
| 4,970,242 A | 11/1990 | Lehman |
| 5,070,917 A * | 12/1991 | Ferris et al. ................... 141/38 |
| 5,124,395 A | 6/1992 | Abramowski et al. |
| 5,251,787 A | 10/1993 | Simson |
| 5,338,776 A | 8/1994 | Peelor et al. |
| 5,364,463 A | 11/1994 | Hull |
| 5,386,857 A | 2/1995 | Fogal, Sr. et al. |
| 5,472,023 A | 12/1995 | Fogal, Sr. et al. |
| 5,500,456 A | 3/1996 | Hughett et al. |
| 5,618,912 A | 4/1997 | Fang |
| 5,648,406 A | 7/1997 | Peelor et al. |
| 5,705,604 A | 1/1998 | Fang |
| 5,765,601 A | 6/1998 | Wells et al. |
| 5,887,762 A | 3/1999 | Hanna |
| 5,908,145 A * | 6/1999 | Jaksa ........................... 222/394 |
| 6,176,285 B1 * | 1/2001 | Gerresheim et al. ......... 152/509 |
| 6,283,172 B1 | 9/2001 | Thurner |
| 6,412,524 B1 * | 7/2002 | Fogal, Sr. ..................... 141/38 |
| 6,736,170 B2 * | 5/2004 | Eriksen et al. ................ 141/38 |
| 6,766,834 B1 | 7/2004 | Eckhardt |
| 6,789,581 B2 * | 9/2004 | Cowan et al. .................. 141/38 |
| 6,889,723 B2 * | 5/2005 | Gerresheim et al. .......... 141/38 |
| 6,964,284 B2 * | 11/2005 | Eckhardt ........................ 141/38 |
| 6,968,869 B2 * | 11/2005 | Eckhardt ........................ 141/38 |
| 7,021,348 B2 * | 4/2006 | Eriksen et al. ............... 152/415 |
| 7,028,720 B2 * | 4/2006 | Eckhardt ........................ 141/38 |
| 7,178,564 B2 * | 2/2007 | Kojima et al. ................. 141/38 |
| 7,389,800 B2 * | 6/2008 | Hickman et al. ............... 141/26 |
| D583,206 S * | 12/2008 | Trachtenberg et al. ...... D8/14.1 |
| 7,694,698 B2 * | 4/2010 | Marini ............................ 141/38 |
| 7,778,110 B2 | 8/2010 | Martin et al. |
| 7,789,110 B2 * | 9/2010 | Marini ............................ 141/38 |
| 7,878,360 B2 * | 2/2011 | Takeda ..................... 220/203.13 |
| 7,891,385 B2 * | 2/2011 | Yanagi et al. .................. 141/38 |
| 8,251,105 B2 * | 8/2012 | Lolli et al. ..................... 141/38 |
| 8,491,275 B2 * | 7/2013 | Lolli et al. .................... 417/313 |
| 8,505,591 B2 * | 8/2013 | Eckhardt ........................ 141/38 |
| 8,752,595 B2 * | 6/2014 | Marini ............................ 141/38 |
| 2002/0112777 A1 | 8/2002 | Fang et al. |
| 2003/0047652 A1 | 3/2003 | Eckhardt |
| 2003/0056851 A1 | 3/2003 | Eriksen et al. |
| 2004/0159365 A1 * | 8/2004 | Cowan et al. .................. 141/38 |
| 2004/0173282 A1 * | 9/2004 | Laetgaard ...................... 141/38 |
| 2006/0086403 A1 * | 4/2006 | Kant et al. ..................... 141/38 |
| 2006/0217662 A1 | 9/2006 | Hickman et al. |
| 2006/0272731 A1 * | 12/2006 | Takeda ........................... 141/38 |
| 2007/0181209 A1 * | 8/2007 | Stehle ............................ 141/38 |
| 2008/0029181 A1 * | 2/2008 | Marini ............................ 141/38 |
| 2008/0098855 A1 * | 5/2008 | Cegelski et al. .............. 81/15.6 |
| 2009/0050232 A1 * | 2/2009 | Guan et al. .................... 141/38 |
| 2009/0056850 A1 * | 3/2009 | Yanagi et al. ................ 152/504 |
| 2009/0107578 A1 * | 4/2009 | Trachtenberg et al. ......... 141/5 |
| 2009/0301602 A1 * | 12/2009 | Lolli et al. ..................... 141/38 |
| 2011/0116941 A1 * | 5/2011 | Lolli et al. .................... 417/313 |
| 2011/0155279 A1 * | 6/2011 | Marini ............................. 141/5 |
| 2011/0155280 A1 * | 6/2011 | Eckhardt ........................ 141/38 |
| 2012/0042987 A1 * | 2/2012 | Lolli .............................. 141/94 |

FOREIGN PATENT DOCUMENTS

| | | |
|---|---|---|
| DE | 101 06 468 A1 | 8/2002 |
| EP | 08 15 8282 | 7/2008 |
| JP | 2004-338158 A | 12/2004 |
| WO | 00/21875 A1 | 4/2000 |
| WO | DM/058926 | 1/2002 |
| WO | 03/004328 A1 | 1/2003 |
| WO | 03/041949 | 5/2003 |
| WO | 2004/041649 A1 | 5/2004 |
| WO | 2008/057195 A2 | 5/2008 |

\* cited by examiner

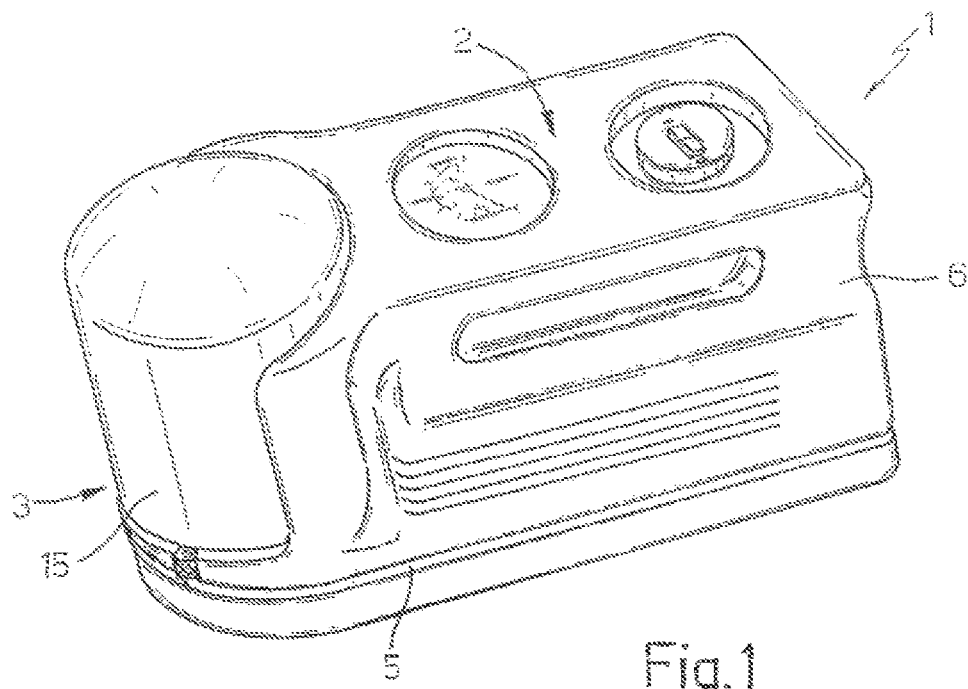
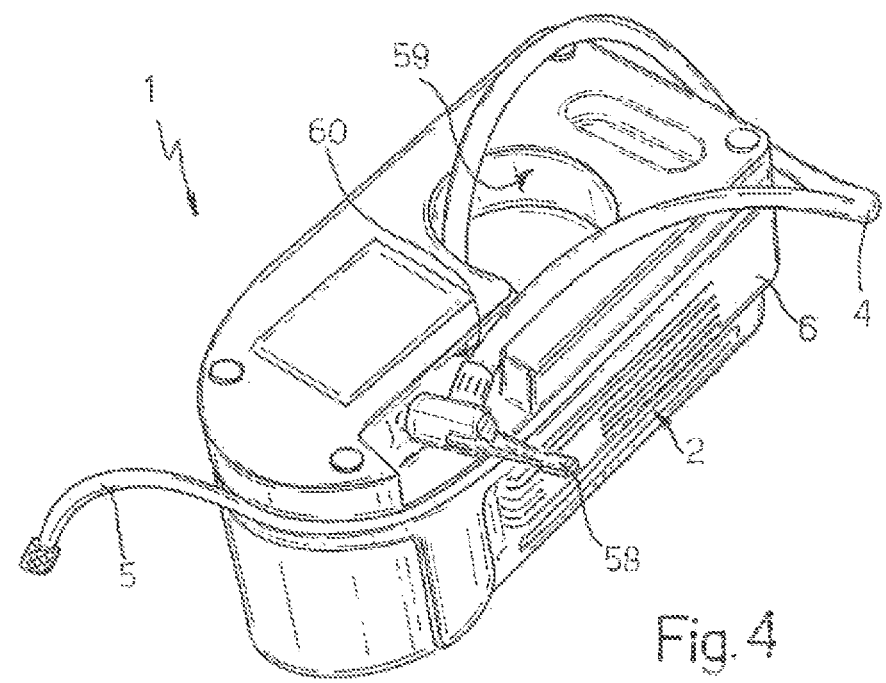

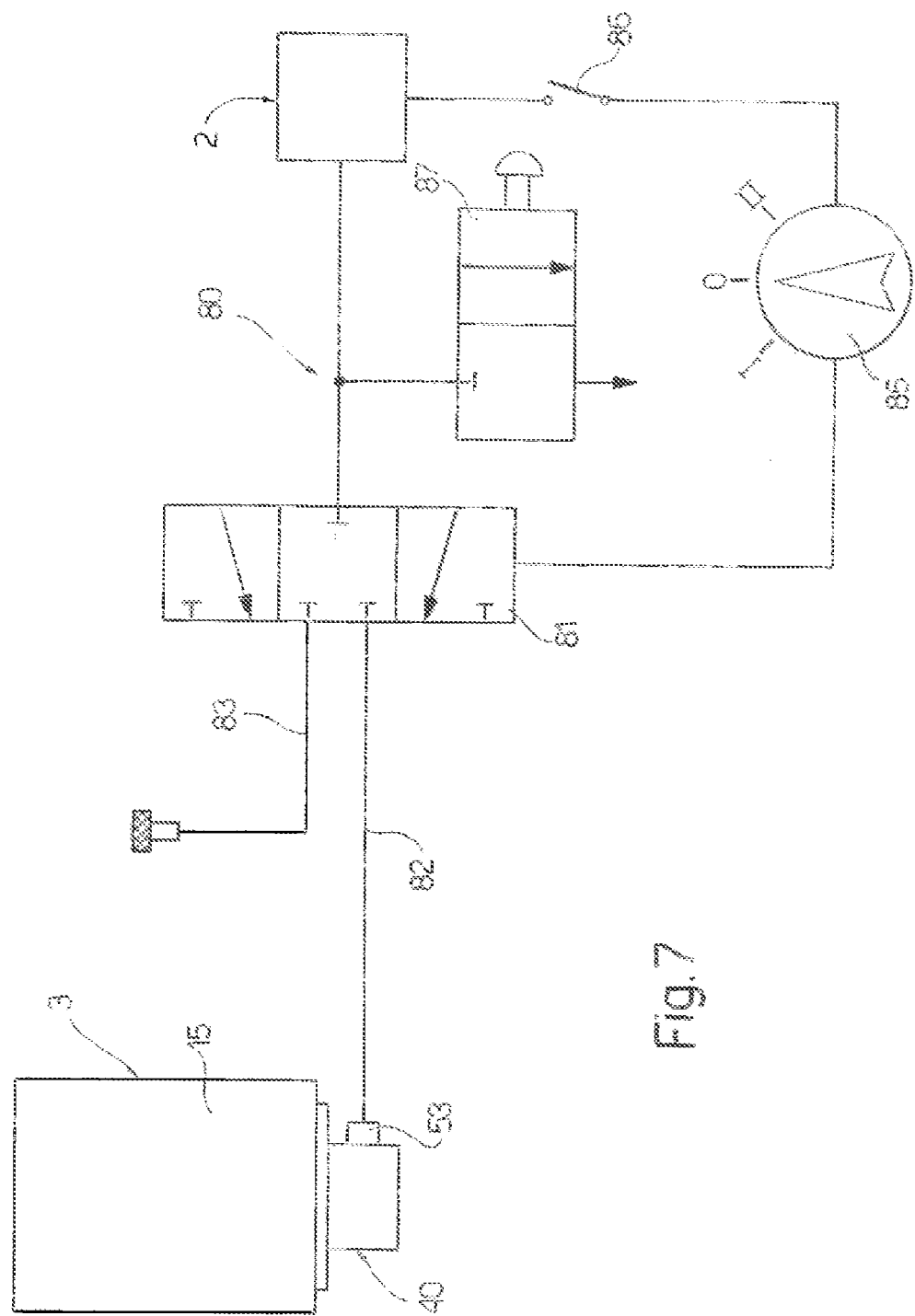

KIT FOR INFLATING AND REPAIRING INFLATABLE ARTICLES, IN PARTICULAR TYRES

This application is a CONTINUATION of application Ser. No. 12/845,897 filed on Jul. 29, 2010 which is a CONT of application Ser. No. 10/591,033 filed on Jul. 26, 2007 (Now U.S. Pat. No. 7,789,110 issued Sep. 7, 2010) which is a 371 of International Application PCT/IB2005/00309 filed on Feb. 8, 2005, which designated the U.S., claims the benefit thereof and incorporates the same by reference. The prior U.S. application(s), including any prior International Application designating the U.S., identified above, in turn itself claim foreign priority of Italian Application No. TO 2004A000117 filed Feb. 27, 2004.

TECHNICAL FIELD

The present invention relates to a kit for inflating and repairing inflatable articles, in particular, tyres.

BACKGROUND ART

Sealing liquids for fast repair of inflatable articles are known. The liquid is fed into the article for repair by means of compressed air, e.g. by means of a compressor, penetrates any holes or slits in the article, and sets on contact with air, thus rapidly sealing the article.

Such liquids are widely used for fast tyre repair, to which the following description refers for the sake of clarity and purely by way of example.

Vehicle spare wheels pose a number of well-known problems, not least of which are their considerable size and weight.

More specifically, if the wheel is housed inside the vehicle, normally in a compartment to the side of or beneath the boot, the capacity of the boot is greatly reduced, and the tyre is difficult to remove, especially when the boot is full.

Conversely, if stowed outside the vehicle, normally in a compartment beneath the floor, or attached to the rear door, the wheel can easily be stolen and is still not easy to remove.

Given the good road conditions in most countries, punctures are now rare, so that changing a wheel can prove extremely difficult, if not impossible, on account of the bolts being locked tight, and in any case is awkward by being performed in critical conditions (traffic, poor lighting, bad weather). Considerable advantage is to be gained, therefore, by replacing the spare wheel with a repair and inflation kit comprising a small compressor and a container of sealing liquid, which can be stowed easily in a special compartment or in the boot of the car.

In addition to the big reduction in size and weight, puncture repair is also made faster and easier; as opposed to changing the wheel, the compressor is simply connected to a current outlet on the vehicle, the container of sealing liquid is connected to the compressor and to the valve of the tyre for repair, and the compressor is started to feed the liquid into the tyre. For this purpose, the container normally has a dispenser unit comprising an inlet conduit and an outlet conduit connected respectively, by respective conduits, to the compressor and the valve of the tyre for repair.

The container and the compressor are normally separate parts that must be connected prior to use, and which at most are housed for convenience inside the same holder.

This therefore includes additional work prior to use.

In one known solution, the container is fitted permanently to the dispenser unit, which incorporates a sealing device. The container, in itself open, is therefore undetachable from the dispenser unit.

Another drawback of this solution is that, when the use-by date of the sealing liquid expires, both the container and the dispenser unit must be replaced, thus increasing cost.

In another known solution, the container itself is sealed, e.g. by a sealing membrane, which is split when the container is fitted to the dispenser unit. This means also the dispenser unit must be fitted to the container just prior to use, thus making additional work.

DISCLOSURE OF INVENTION

It is an object of the present invention to provide a kit for repairing and inflating inflatable articles, designed to eliminate the aforementioned drawbacks typically associated with known kits.

According to the present invention, there is provided a kit for inflating and repairing inflatable articles, in particular, tyres; the kit comprising a compressor assembly, a container of sealing liquid, and connecting means for connecting the container to the compressor assembly and to an inflatable article for repair or inflation, and being characterized by comprising an outer casing housing said compressor assembly and defining a seat for the container of sealing liquid, said container being housed removably in said seat, and by comprising connecting means for stably connecting said container to said compressor assembly, so that the container, when housed in said seat, is maintained functionally connected to said compressor assembly.

BRIEF DESCRIPTION OF THE DRAWINGS

A preferred, non-limiting embodiment of the present invention will be described by way of example with reference to the accompanying drawings, in which:

FIG. 1 shows a view in perspective of a repair kit comprising a container of dealing liquid and in accordance with the present invention;

FIGS. 3 and 4 show a rear view and underside view in perspective respectively of the FIG. 1 kit partly disassembled;

FIG. 7 shows a schematic of a pneumatic circuit connected to the FIG. 2 kit dispenser unit.

BEST MODE FOR CARRYING OUT THE INVENTION

Figure 3:
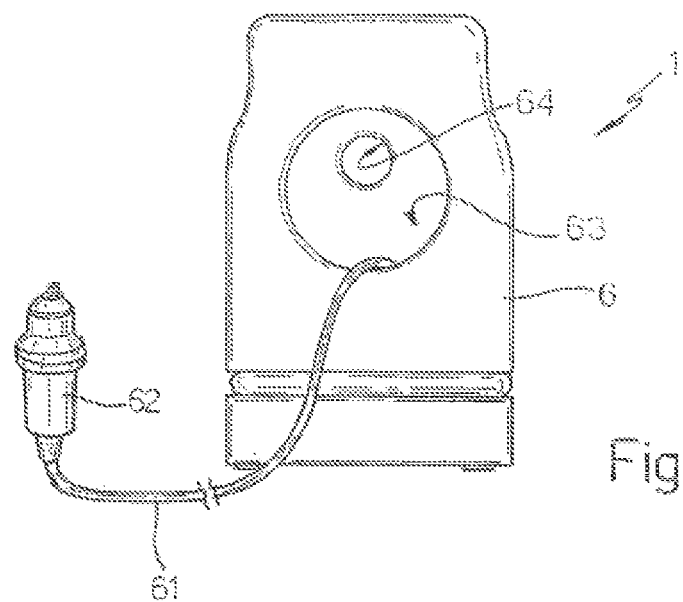

Number 1 in FIGS. 1 to 4 indicates as a whole a kit for fast repair of inflatable articles, in particular, tyres.

Kit 1 substantially comprises an electric compressor assembly 2; a container 3 of sealing liquid; a first hose 4 connecting container 3 to compressor assembly 2; and a second hose 5 connecting container 3 to a valve (not shown) of the tyre.

In known manner not shown, compressor assembly 2 comprises an electric motor and a compressor—powered by the electric motor—which are housed inside an outer casing 6.

Casing 6 is substantially parallelepiped-shaped and, at one longitudinal end, defines a seat 7 for housing container 3 upside down. More specifically, seat 7 is bounded laterally by a substantially semicylindrical end wall 10 of casing 6, and at the bottom by a circular base 14 projecting from end wall 10.

Container 3 comprises a vessel 15, preferably in the form of a bottle, containing the sealing liquid and having an externally threaded neck 16 defining an opening 17 (FIGS. 5 and 6); and a valve device 18 housed in opening 17. Valve device 18 forms an integral part of container 3, to ensure the container is closed fluidtight when detached from the rest of kit 1, as explained in detail below.

Valve device 18 comprises a body 19 having a cylindrical lateral wall 20, of axis A, inserted in fluidtight manner inside neck 16, and a portion 20a of which extends beyond neck 16, into vessel 15, and is closed at one end by an end wall 21.

Portion 20a has two circumferential series of holes 21, 25 communicating with the inside of vessel 15, spaced axially apart, and located close to end wall 21 end close to neck 16 respectively.

Body 19 of valve device 18 also comprises as inner member 26 defined by a tubular rod 27 of axis A, and by a supporting ring 28 fixed inside an open end of body 19 and connected integrally to tubular rod 27 by a number of spokes 29 forming a number of axial passages 29a.

Rod 27 has a first end position 27a close to end wall 21, and a conveniently flanged second end portion 27b projecting axially outwards of body 19, and defines internally an axial passage 27c.

Valve device 18 comprises a tubular slide 30, which slides axially inside the annular chamber 36 formed between body 19 and rod 27. Slide 30 is maintained in an axial stop position against end wall 21 by a helical spring 31 compressed axially between slide 30 and supporting ring 26.

Slide 30 has a circumferential series of holes 32 formed at an outer annular groove 33 dividing the slide into two portions 37, 38. Slide 30 also comprises two pairs of outer, axially spaced sealing rings (O-rings) 34a, 34b and 35a, 35b, which are housed in respective annular seats and form a sliding seal between slide 30 and body 19. The two pairs of O-rings 34a, 34b and 35a, 35b are located on axially opposite sides of holes 32. More specifically, O-rings 34a, 34b are carried by portion 37 facing end wall 21, and O-rings 35a, 35b are carried by portion 38 facing end portion 27b of rod 27. In said axial stop position of slide 30, O-ring 34a is located between holes 24 and end wall 21; O-ring 34b is located between holes 24 and holes 32; O-ring 35a is located between holes 25 and holes 32; and O-ring 35b is located on the axially opposite side of holes 25 to O-ring 35a.

Portion 37 of slide 30 slides in fluidtight manner on rod 27, preferably with the interposition of an O-ring 38a on rod 27. Portion 38 of slide 30 is larger in inside diameter than rod 27, and defines with rod 27 a chamber 39 open towards the flanged end portion 27b of rod 27 and communicating with holes 32.

Figure 5:
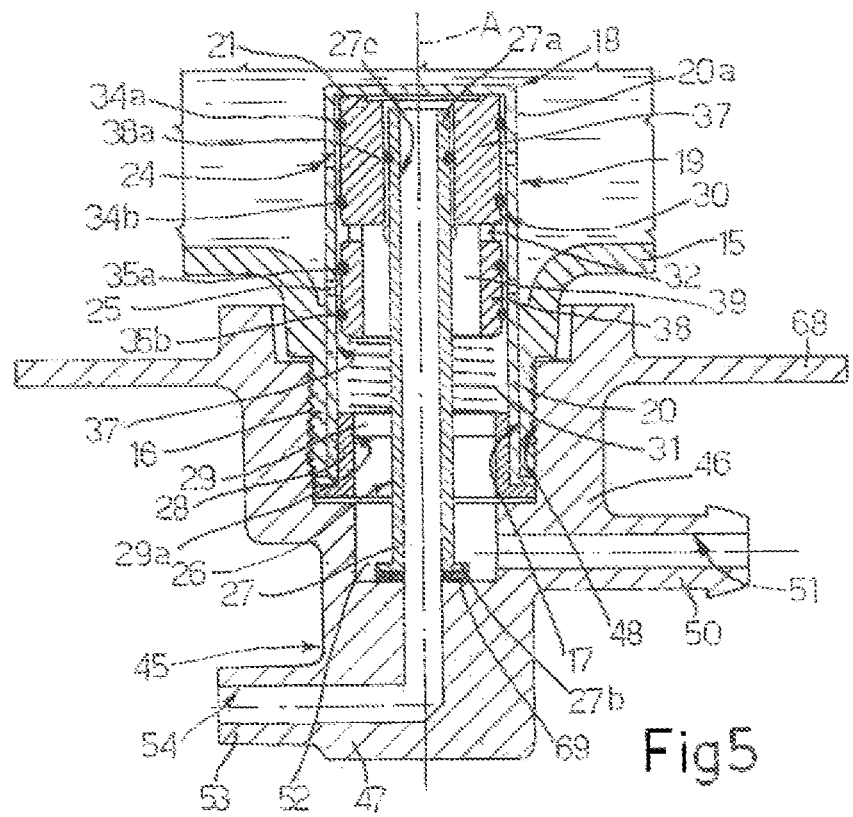
FIGS. 5 and 6 show sections, along line V-V in FIG. 2, of the container and a dispenser unit of the FIG. 2 kit assembled together.
Figure 6:
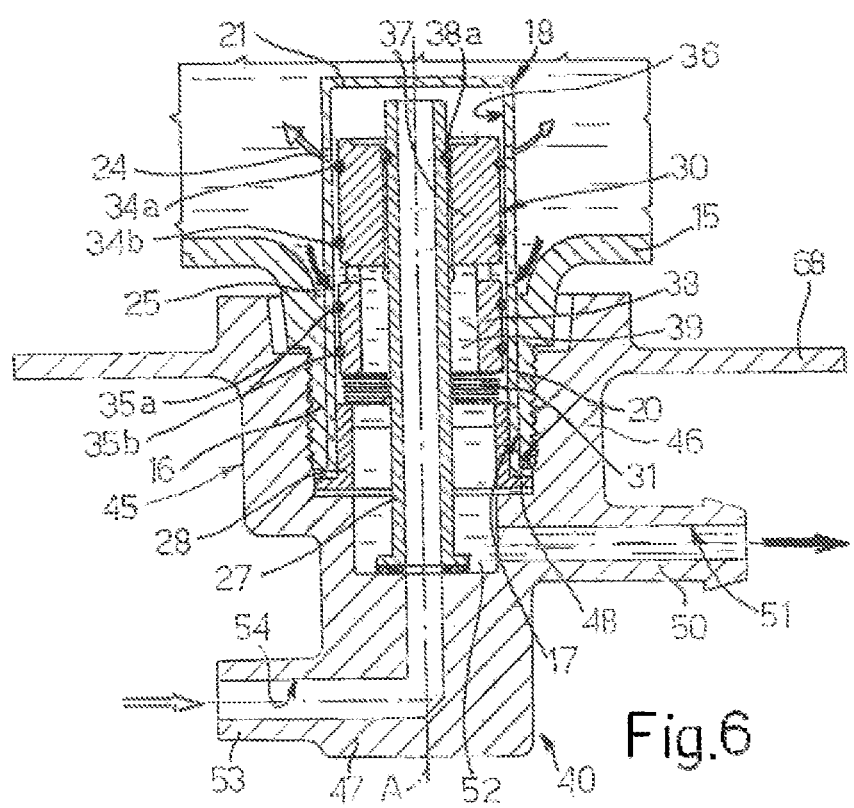

Kit 1 also comprises a dispenser unit 40, which is housed stably but detachably inside a recess 44 in base 14 of casing 6, and is connected detachably to container 3 to fit it, upside down, to casing 6 (FIGS. 1, 5 and 6).

More specifically, dispenser unit 40 substantially comprises a plug-like central portion 45 having a substantially cylindrical lateral wall 46 and an end wall 47, which define an internally threaded cavity 48 into which neck 16 of vessel 15 is screwed; and a circular flange 68 extending radially from central portion 45 and defining a bayonet connection with corresponding fastening means 49 in base 14 of casing 6.

Dispenser unit 40 also comprises a first tubular fitting 50 projecting radially from central portion 15 and defining a conduit 51 communicating with and radial with respect to a bottom portion 52 of cavity 48; and a substantially pipe-like second tubular fitting 53 projecting radially, close to end wall 47 of central portion 45, in a radial direction perpendicular to that of first tubular fitting 50. Second tubular fitting 53 defines a conduit 54 communicating coaxially with bottom portion 52 of cavity 48.

When container 3 is screwed into dispenser unit 40, end portion 27b of tubular rod 27—possibly fitted with an annular sealing member 69 on the end—cooperates in fluidtight manner with end wall 47 of central portion 45, so that the internal axial passage 27c of rod 27 communicates with and substantially constitutes an extension of conduit 54 (FIGS. 5 and 6).

Figure 2:
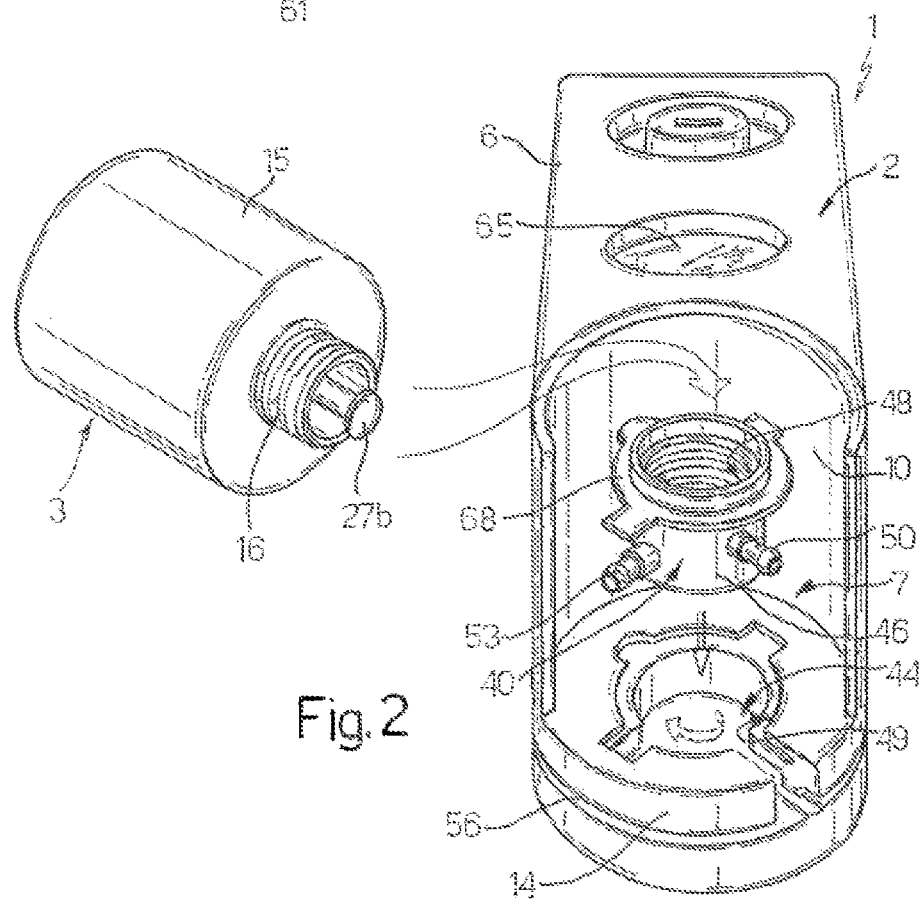
FIG. 2 shows a partly disassembled view in perspective of the FIG. 1 kit.

Base 14 has lateral openings (one shown in FIG. 4) through which fittings 50, 53 are accessible from outside casing 6, once dispenser unit 40 is bayonet connected inside recess 44 in base 14, e.g. by rotating it 45° with respect to the FIG. 2 insertion position.

First fitting 50 is connected to hose 5, which, when not in use, may be wound about the casing and housed inside a peripheral groove 56 in the casing; and second fitting 53 is connected to compressor 2 by hose 4. Conveniently, hose 4 is longer than required for connection to fitting 53, and is fitted on its free end with a fast-fit, e.g. lever-operated, coupling 58. Hose 4 is therefore normally connected to second fitting 53, but can be detached easily and connected directly to the article, e.g. a tyre, ball, dinghy, etc., if this simply needs inflating and not repair. Hose 4 is normally stowed almost entirely inside a seat 59 farmed on the underside of casing 6, from which it extends along an underside groove 60 housing the end portion of hose 4 fitted with coupling 53.

Second fitting 53 is located at a different height from first fitting 50, so as to avoid any interference with hose 5 wound about casing 6.

Compressor assembly 2 has an electric power cable 61 fitted on the end with a connector 62 for connection to a current outlet on the vehicle. Cable 61 is normally housed in a seat 63 formed in a portion of casing 6 opposite seat 7 for container 3, and connector 62 is stowed inside a cavity 64 in seat 63. Compressor assembly 2 is conveniently provided with a gauge 65 and a switch 66.

Kit 1 and particularly container 3 operate as follows.

Kit 1 is an integrated preassembled unit, which is supplied ready for use as shown in FIG. 1.

To repair an inflatable article, e.g. a tyre, hose 5 is simply connected to the tyre valve, and compressor assembly 2 activated.

The air pressure along hose 4, fitting 50, and internal passage 27c of rod 27, is transmitted to the end of annular chamber 36, and exerts thrust on the end surface of slide 30 adjacent to end wall 21.

Slide 30 therefore moves, in opposition to spring 31, from the FIG. 5 rest position to the FIG. 6 position, in which O-rings 34a, 34b are interposed between holes 24 and holes 25, and O-ring 35a has moved past holes 25, so that holes 32 in slide 30 communicate with holes 25. Compressed air therefore flows through holes 24 into container 3, which is therefore pressurized, so that sealing liquid flows through holes 25 and holes 32 into chamber 39 in slide 30, and is fed along fitting 50 and hose 5 to the tyre.

Device 18 therefore acts as a two-way, two-position, pneumatic valve. In the closed position (FIG. 5), the container is sealed; with pressure along the feed line defined by hose 4, device 18 opens automatically to allow compressed air into container 3, and simultaneous outflow of sealing liquid.

The advantages of kit 1 according to the present invention will be clear from the foregoing description.

In particular, kit 1 is a compact, integrated unit that can be stowed ready for use, with no additional work required, other than connection to the vehicle electric system and to the tyre.

Container 3 with an integrated valve device 18 constitutes an independent sealed unit, regardless of whether or not it is connected to dispenser unit 40.

After use, or when the sealing liquid use-by date expires (normally after a few years), only container 3 need be replaced. That is, dispenser unit 40 need not be replaced, and may be left permanently inside casing 6.

Using a two-way valve device 18 closed stably in the absence of pressure along the feed line 4, sealing liquid leakage is prevented, even in abnormal conditions, such as overpressure in container 3 caused by high temperature inside the boot of a car parked in the sun.

Using a valve device 18, container 3 is ready for use at all times, i.e. fitted permanently to kit 1. Container 3, in fact, is sealed but operated immediately in response to turning on the compressor.

Unit 40 is preferably detachable from casing 6 and carried by container 3.

Clearly, changes may be made to kit 1 as described herein without, however, departing from the scope of the accompanying claims.

In particular, FIG. 7 shows a diagram of a pneumatic sealing liquid dispensing circuit 80 comprising a three-way, three-position valve 81, a conduit 82 connected to second fitting 53, and an additional hose 83 connectable to the tyre. Valve 81 is input connected to the compressor of compressor assembly 2, and is output connected to conduit 82 and additional hose 83.

Valve 81 is controlled by a hand-operated selector 85 located on casing 6 and cooperating with an on-switch 86 of compressor assembly 2, in use, selector 85 defines a disabling position, in which on-switch 86 is disabled and compressor assembly 2 cannot be started, thus preventing it from being turned on accidentally; and a first and second enabling position, in which on-switch 86 is enabled to start the compressor. More specifically, in the first enabling position, valve 81 is switched automatically to connect the compressor to dispenser unit 40 via second fitting 53 and disconnect additional hopes 83; and, in the second enabling position, valve 81 is switched automatically to connect the compressor to additional hose 83 and disconnect dispenser unit 40, Additional hose 83 is housed in casing 6, and enables compressor assembly 2 to be used quickly and easily to inflate a flat tyre.

Pneumatic circuit 80 and hose 5 may also be connected to one or more hand-operated relief valves 87, to prevent overpressure in conduit 82 and hoses 5 and 83, or, when the compressor is off, to accurately adjust the pressure of the inflatable article as required.

The end of hose 5 connected to the tyre may be fitted with a non-return valve, so prevent sealing liquid leakage when nose 5 is detached from the tyre.

Container 3 may also be connected to casing 6 by a click-on coupling acting in a direction parallel to axis A.

The invention claimed is:

1. A kit for inflating and repairing inflatable articles; the kit comprising
   a compressor assembly,
   a container of sealing liquid,
   a first hose connected to said container for connecting the container to an inflatable article for repair or inflation and bearing at the end distal from the container with a connector for connecting with a valve on the inflatable article,
   a second hose for connecting said compressor to an inflatable article for inflation and bearing at the end distal from the container with a connector for connecting with a valve on the inflatable article,
   an outer casing housing said compressor assembly and defining a seat for the container of sealing liquid, said casing providing a peripheral groove for storing one of said hoses when not in use said container being housed removably in said seat,
   a compressed air feed line linking said compressor assembly and said container for stably connecting said container to said compressor assembly, so that the container, when housed in said seat, is maintained functionally connected to said compressor assembly, and
   a selector operable by hand having an inlet connected to said compressor assembly, and outlets connected to said container and to said second hose to direct a stream of compressed air selectively to said container or to said second hose.

2. A kit as claimed in claim 1 wherein said container comprises a vessel having an opening and a valve device fitted in fluidtight manner to the opening and having an inlet connectable to said compressed-air feed line, and an outlet for the sealing liquid.

3. A kit as claimed in claim 2, wherein said valve device comprises at least one control member movable, in response to pressurization of said compressed-air feed line, from a closed position, closing said valve device and in which said inlet and said outlet are isolated from the inside of said container, to an open position in which said inlet and said outlet communicate with the inside of said container.

4. A kit as claimed in claim 3 wherein said valve device comprises elastic means for keeping said control member stably in said closed position in the absence of pressure to said inlet.

5. A kit as claimed in claim 1 comprising a dispenser connectable detachably to said container unit and having an inlet fitting connected in fluidtight manner to said inlet of said valve device, and an outlet fitting connected in fluidtight manner to said outlet of said valve device.

6. A kit as claimed in claim 5, wherein said dispenser unit is detachable from said casing.

7. A kit as claimed in claim 6, wherein said seat comprises a base portion having fast-fit fastening means by which to secure said dispenser unit to said casing.

8. A kit as claimed in claim 7, wherein said fastening means comprise a bayonet connection.

9. A kit as claimed in claim 7 wherein said fastening means comprise a fast-fit click-on coupling.

10. A kit as claimed in claim 5 wherein said dispenser unit comprises a cavity to which is fitted a neck of said container in an upside down position; said neck defining said opening.

11. A kit as claimed in claim 1, wherein at least one of said first hose and said second hose is connected to a relief valve.

12. A kit as claimed in claim 1, wherein said compressed air feed line comprises a non-return valve.

13. A kit as claimed in claim 1 wherein the selector has three positions, one to disable the compressor assembly, one adapted to cause compressed air from the compressor assembly to be directed into said compressed air feed connecting to the container and the third adapted to cause compressed air from said compressor assembly to be directed into said second hose.

* * * * *